US008483765B2

(12) United States Patent
Cho

(10) Patent No.: US 8,483,765 B2
(45) Date of Patent: Jul. 9, 2013

(54) USER TERMINAL FOR PERFORMING A PLURALITY OF APPLICATIONS SIMULTANEOUSLY

(75) Inventor: Jung-Hee Cho, Seongnam-si (KR)

(73) Assignee: KT Corporation, Gyeonggi-Do (KR)

( * ) Notice: Subject to any disclaimer, the term of this patent is extended or adjusted under 35 U.S.C. 154(b) by 1056 days.

(21) Appl. No.: 11/990,399

(22) PCT Filed: Aug. 26, 2005

(86) PCT No.: PCT/KR2005/002831
§ 371 (c)(1),
(2), (4) Date: Feb. 13, 2008

(87) PCT Pub. No.: WO2007/024035
PCT Pub. Date: Mar. 1, 2007

(65) Prior Publication Data
US 2009/0036108 A1 Feb. 5, 2009

(51) Int. Cl.
*H04M 1/00* (2006.01)
*H04B 1/38* (2006.01)
(52) U.S. Cl.
USPC ............ 455/566; 455/158.4; 455/569.1
(58) Field of Classification Search
USPC ........... 455/456.4, 67.7, 68, 550.1, 552.1, 455/553.1, 556.1, 557, 565, 566, 567, 569.1, 455/145, 158.4, 154.2
See application file for complete search history.

(56) References Cited

U.S. PATENT DOCUMENTS

| 7,162,276 | B2 * | 1/2007 | Iwase | 455/569.1 |
|---|---|---|---|---|
| 2002/0173283 | A1 * | 11/2002 | Morewitz et al. | 455/130 |
| 2003/0083106 | A1 * | 5/2003 | Seo | 455/566 |
| 2003/0119562 | A1 * | 6/2003 | Kokubo | 455/566 |
| 2003/0203746 | A1 * | 10/2003 | Iwase | 455/569.1 |
| 2004/0203975 | A1 * | 10/2004 | Chen et al. | 455/517 |
| 2005/0239446 | A1 * | 10/2005 | Tagawa et al. | 455/414.1 |

FOREIGN PATENT DOCUMENTS

| EP | 1309157 | 5/2003 |
|---|---|---|
| KR | 10-2002-0087756 | 11/2002 |
| KR | 10-2003-0054620 | 7/2003 |
| KR | 10-2005-0052086 | 6/2005 |
| WO | 98/48550 | 10/1998 |

* cited by examiner

*Primary Examiner* — Ping Hsieh
(74) *Attorney, Agent, or Firm* — Harness, Dickey & Pierce, P.L.C.

(57) ABSTRACT

A user terminal for running a plurality of applications simultaneously is disclosed. In the method for running a plurality of applications simultaneously in accordance with the present invention, a first application is run in a foreground mode in accordance with an inputted first operation start command, and then the operation mode of the first application is switched to a background mode if a mode conversion command is inputted. Then, a second application in accordance with an inputted second operation start command can be run in the foreground mode. With the present invention, a plurality of applications can be run simultaneously in a separate operation mode, maximizing the convenience of the user.

3 Claims, 6 Drawing Sheets

USER TERMINAL FOR PERFORMING A PLURALITY OF APPLICATIONS SIMULTANEOUSLY

TECHNICAL FIELD

The present invention relates to a mobile communication terminal, particularly to running an application installed in a mobile communication terminal.

BACKGROUND ART

Today, mobile communication terminals have become a necessary item for everyone due to their mobility and convenience. Mobile communication terminals not only have their essential function of telephone communication but also are equipped with additional applications for address book, schedule, wireless Internet access, alarm and audio data (e.g. an MP3 file) playback.

Users are using the mobile communication terminal to play back MP3 files, to send short messages, to set the alarm, to play games and to access the Internet wirelessly, while not using the telephone function.

Due to the limitations of work space, display screen and priority between functions, however, mobile communication devices are restricted to perform one function at a time.

For example, while the terminal is set to play back MP3 files, the user can not access the Internet wirelessly. Likewise, the user can not re-set the alarm while sending a short message.

Moreover, if a call is received while writing a short message, the user must write the short message again after the call is finished because the mobile communication terminal automatically switches to a telephone mode.

The Korean publication number 10-2005-0052086 discloses a mobile communication terminal technology that is capable of sending a short message while playing back an MP3 file. However, this was achieved by merely inserting an application for sending a short message in an application for playing back MP3 files.

Even with this type of mobile communication terminal, the user can run one application only, and only use sub-applications (i.e. MP3 file playback and short message transmission) included in the pertinent application.

As described above, since conventional mobile communication terminals have a limitation of not being able to run a plurality of applications simultaneously, the first application must be stopped if the user wants to run another application while one application is running.

DISCLOSURE

Technical Problem

Therefore, the present invention provides a mobile communication terminal and a method for running a plurality of applications simultaneously that can maximize user convenience by enabling a plurality of applications to run simultaneously in a separate operation mode.

The present invention also provides a mobile communication terminal and a method for running a plurality of applications simultaneously that does not cause the user to stop what he or she has been running by allowing the already-running application to continue to run in a different mode in case a call or a message is received while running the application.

The present invention also provide a mobile communication terminal and a method for running a plurality of applications simultaneously that does not require the modification of existing applications or the generation of a combined application combining applications for simultaneous running, by pluralizing the operation mode of application.

The present invention also provides a mobile communication terminal and a method for running a plurality of applications simultaneously that can individually control the operation of an application that runs in a plurality of modes.

The present invention also provides a mobile communication terminal and a method for running a plurality of applications simultaneously that can reduce the manufacturing cost of the terminal by playing back audio data not in an MP3 processor chip but in an application.

Other objects of the present invention will be easily understood through the following description.

Technical Solution

In order to achieve the above objects, an aspect of the present invention features a method for running a plurality of applications simultaneously and a recorded medium recording a program enabling the execution of the method.

In an embodiment of the present invention, the method for running a plurality of applications simultaneously in a mobile communication terminal comprises: running a first application in a foreground mode in accordance with an inputted first operation start command; switching the operation mode of the first application to a background mode if a mode conversion command is inputted; and running a second application in the foreground mode in accordance with an inputted second operation start command.

The above method can further comprise: determining whether the mode conversion command is inputted again; and re-setting the operation mode to have the first application run in the foreground mode and the second application run in the background mode if the mode conversion command is inputted again.

The method can further comprise: determining whether a key button is inputted using an input unit located on the mobile communication terminal; generating a control command corresponding to the key button input, if the key button is inputted; and controlling the operation of the second application, using the generated control command.

The method can further comprise: determining whether the key button is inputted using an external I/O device, the external I/O device being coupled to the mobile communication terminal wirelessly or through wire; generating a control command corresponding to the key button input, if the key button is inputted and the first application is an audio playback application; and controlling the operation of the first application, using the generated control command.

The method can further comprise: determining whether the first application and the second application are audio playback applications; outputting a processed sound through a sound output unit if any one of the applications is the audio playback application; and outputting a sound processed by the second application through the sound output unit if both applications are the audio playback application.

In another embodiment of the present invention, the method for running a plurality of applications simultaneously in a mobile communication terminal comprises: running a corresponding application in a foreground mode in accordance with an inputted operation start command; determining whether a call is received; switching the operation mode to have the application run in a background mode if the call is received; and executing a telephone communication function, using the foreground mode.

This method can further comprise: determining whether the telephone communication function is finished; and switching the operation mode to have the application run in the foreground mode if the telephone communication function is finished.

An audio playback condition can be renewed to a predetermined condition if the application is an audio playback application, and the predetermined condition can be any one of the adjusting the volume to 0 (zero), adjusting the volume to a predetermined level, pausing and stopping.

The method can further comprise: determining whether the telephone communication function is finished; and switching the operation mode to have the application run in the foreground mode if the telephone communication function is finished; and running the application in accordance with the audio playback condition.

In order to achieve the above objects, another aspect of the present invention features a mobile communication terminal that can run a plurality of applications simultaneously.

In an embodiment of the present invention, the mobile communication terminal, running a plurality of applications simultaneously, can comprise: an input control unit, generating and outputting command data corresponding to one of an operation start command and a control command in accordance with a predetermined key button input; an application management control unit, controlling 2 applications corresponding to the 2 operation start commands, outputted sequentially by the input control unit, to run sequentially; a foreground control unit, controlling the operation of a first application in accordance with the control command; a background control unit, controlling the operation of a second application in accordance with the control command; and a screen control unit, controlling the operation status of the first application to be displayed in a display unit.

The input control unit can recognize a signal corresponding to a key button input from an input unit, located on the mobile communication unit, and an external I/O device, coupled to the mobile communication terminal wirelessly or through wire, and output the generated control command to the foreground control unit if the signal is a control signal from the input unit.

The input control unit can recognizes a signal corresponding to a key button input from an input unit, located on the mobile communication unit, and an external I/O device, coupled to the mobile communication terminal wirelessly or through wire, and output the generated control command to the background control unit if the signal is a control signal from the external I/O unit and the second application is an audio playback application.

The application management control unit can control the application controlled by the foreground control unit and the application controlled by the background control unit to switch with each other, if the input control unit generates and outputs a mode conversion command in accordance with a predetermined key button input.

MODE FOR INVENTION

Figure 1:
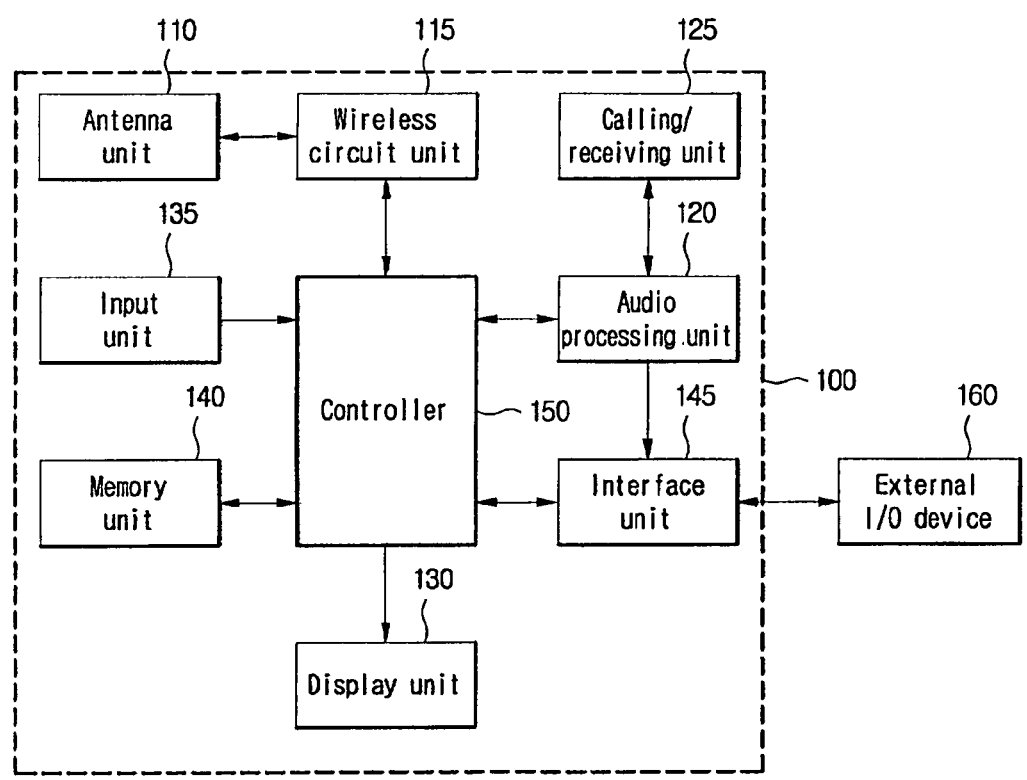
FIG. 1 is a block diagram of a mobile communication terminal in accordance with an embodiment of the present invention.

In order to fully understand the present invention, operational advantages of the present invention and objects achieved by embodying the present invention, the accompanying drawings illustrating embodiments of the present invention and description attached to the drawings must be referenced.

To aid the overall understanding of the description of the present invention, the same reference numerals are assigned to the same means regardless of the figure number. The numbers (e.g. the first and the second) in this description are merely used to distinguish the identical or similar elements.

Hereinafter, embodiments of the present invention will be described with reference to the accompanying drawings.

Figure 2:
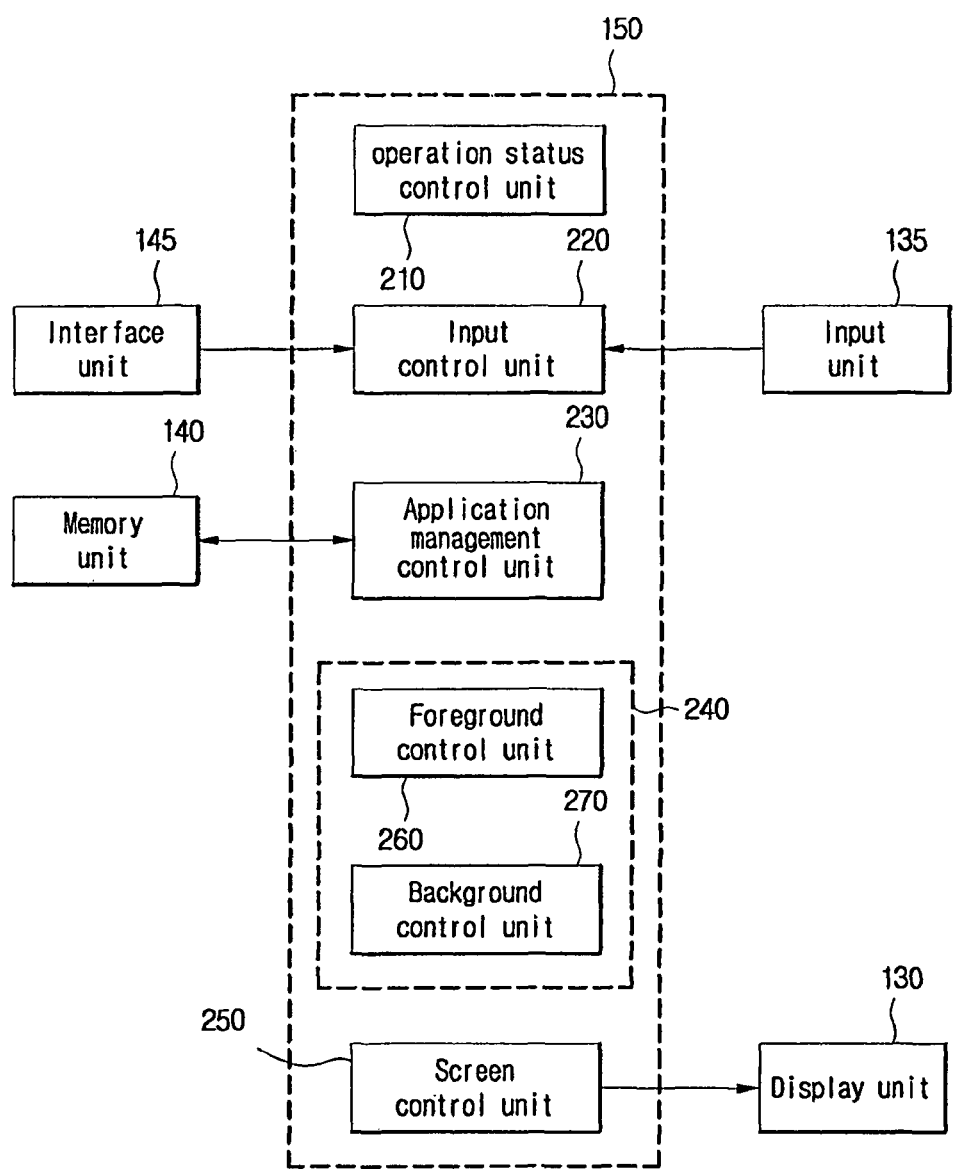
FIG. 2 is a block diagram showing the detailed structure of a controller in accordance with an embodiment of the present invention.

FIG. 1 is a block diagram showing a mobile communication terminal in accordance with an embodiment of the present invention, and FIG. 2 is a block diagram showing the detailed structure of a controller in accordance with an embodiment of the present invention.

Referring to FIG. 1, a mobile communication terminal 100 of the present invention comprises an antenna unit 110, a wireless circuit unit 115, an audio processing unit 120, a calling/receiving unit 125, a display unit 130, an input unit 135, a memory unit 140, an interface unit 145 and a controller 150.

The antenna unit 110 transmits a transmission signal (e.g. a voice signal of a user, a phone call request and a wireless Internet access request), received from the wireless circuit unit 115, to a mobile communication service system (not shown), and receives a wireless signal (e.g. a voice signal of another user, music data according to the user's download request, etc.) from the mobile communication service system and delivers the wireless signal to the wireless circuit unit 115.

The wireless circuit unit 115 receives a voice signal and a message from the mobile communication service system through the antenna unit 110 and delivers to the controller 150. Furthermore, the wireless circuit unit 115 delivers a user command (e.g. an operation command corresponding to a key selection) inputted through the input unit 135 and/or a voice signal of the user inputted through the calling/receiving unit 125 to the antenna unit 110 in accordance with the control of the controller 150.

The audio processing unit 120 processes a voice inputted by the user of the mobile communication terminal 100 through the calling/receiving unit 125 to data and delivers the data to the controller, and processes a voice signal received through the antenna unit 110 and has the voice signal outputted through the calling/receiving unit 125 as an analog voice. In case an external I/O device 160 is coupled to the mobile communication terminal 100 through wire or wirelessly, the audio processing unit 120 can have the sound (e.g. a voice signal, an MP3 data playback signal, sound effects associated with a game) to be outputted through the calling/receiving unit 125 outputted through the external I/O unit 160 in accordance with the control of the controller 150.

The calling/receiving unit 125 can comprise a calling unit, such as a microphone, and a receiving unit, such as a speaker. The microphone is means for receiving the user's voice of the mobile communication terminal 100, and the speaker is means for outputting another user's voice signal, received from the mobile communication service system through the antenna 110, a transmission sound corresponding to the selection of a key button disposed in the input unit 135 and playback sound of MP3 data.

The display unit 130 displays the operation status, application-running screen, time information and received messages of the portable terminal 100. The display unit 130 can be, for example, an LCD screen.

The input unit 135 can comprise a touch screen or at least one key button. The input unit 135 can carry out a role of delivering an instruction of the user to the controller 150.

The memory unit 140 can comprise, for example, a flash memory, a RAM or a ROM. The flash memory stores the operating system and call-processing software, and the variables and status of these programs can be read from the RAM. The flash memory is a non-volatile memory that has a fast processing speed. When software of the mobile communication terminal 100 is upgraded, the new software is stored in the flash memory. The ROM can be an EEPROM, storing non-volatile data, and can input and output according to the control of the controller 150. The ROM can store the semi-permanent NAM (Number Assignment Module) parameter and other storage data (e.g. phone numbers, names, text messages, application programs and application data).

The interface unit 145 is a medium for enabling the mobile communication terminal 100 to couple to the external I/O device 160 through wire or wirelessly and communicate data (e.g. a control command inputted from the external I/O device 160 and sound data delivered to the external I/O device 160). In case the external I/O device 160 and the mobile communication terminal 100 are coupled through wire, the interface unit 145 allows the data to be communicated through wire. If the external I/O device 160 and the mobile communication terminal 100 are connected wirelessly (e.g. through IrDA and Bluetooth), the interface unit 145 allows the data to be communicated wirelessly. The I/O device 160 can be, for example, an earphone or headset, equipped with a remote control.

The controller 150 controls the antenna unit 110, wireless circuit unit 115, audio processing unit 120, calling/receiving unit 125, display unit 130, input unit 135, memory unit 140 and interface unit 145 such that the mobile communication terminal 100 of the present invention can independently run each of a plurality of applications in each of the different operation modes (i.e. a plurality of foreground modes and background modes can be set).

The detailed structure of the controller 150 is shown in FIG. 2.

Referring to FIG. 2, the controller 150 can comprise an operation status control unit 210, an input control unit 220, an application management control unit 230, a mode control unit 240 and a screen control unit 250.

The operation status control unit 210 controls the operation status of the antenna unit 110, wireless circuit unit 115, audio processing unit 120, calling/receiving unit 125, display unit 130, input unit 135, memory unit 140 and interface unit 145 with other elements included in the controller 150. The operation status control unit 210 can activate the telephone function in a new operation mode or terminate the application with a lower priority among a plurality of operation modes (or applications) and activate the telephone mode in accordance with the mode control unit 240, if a call signal is received while the applications are running in a plurality of operation modes.

The operation status control unit 210 can recognize whether the mobile communication terminal 100 is coupled to the external I/O device 160 through wire or wirelessly. The operation status control unit 210 can recognize the connection with the external I/O device by, for example, recognizing the change in voltage level or by any of the various methods known to those or ordinary skill in the art.

The input control unit 220 receives a control command (e.g. start a phone communication when a call is received, play back audio data, stop the playback and pause the playback) of the external I/O device 160, having passed the interface unit 145, and/or a control command (e.g. call request and data input) inputted from the input unit 135 and delivers the control command to the operation status control unit 210 or the mode control unit 240.

The input control unit 220 determines if the inputted control command is inputted from the input unit 135 or the external I/O device 160 and generates command data in a predetermined format to deliver to the mode control unit 240. For example, it can be pre-set that the control command inputted from the input unit 135 is for the control of an application running in a foreground mode while the control command (a phone communication start command can be excluded) inputted from the external I/O device 160 is for the control of an application running in a background mode. Although the control command is inputted from the external I/O device (e.g. a wireless headset and an earphone with a remote control), if the application running in the foreground is for playing back an audio file, it can be set that the control of the applicant is possible. The operation mode of the applications running in the foreground and the background can be changed by use of a mode conversion key disposed in the external I/O device 160.

Of course, it is possible that the signal inputted from the input unit 135 and the external I/O device 160 is a key input signal or voltage difference, and the information generated by the input control unit 220 is the operation start command and control command of an application. For easier understanding of the invention, however, this description assumes that the signal received from the input unit 135 and the external I/O device 160 is the control command, and the information outputted from the input control unit 220 is the command data.

The input control unit 220 can recognize where the control command is inputted from by, for example, recognizing the change in voltage level and by various ways known to those of ordinary skill in the art. The command data can comprise destination information indicating whether the control command is for the foreground mode or background mode, and the input control unit 220 or the operation status control unit 210 can deliver the command data to the mode control unit 240 corresponding to the destination information.

The application management control unit 230 manages the applications stored in the memory unit 140 and runs an application corresponding to the command data by the input control unit 220. The application management control unit 230 can prevent a plurality of applications using the audio processing unit 120 from running. This is because the output of accurate sound data will be difficult if sound data processed by a plurality of applications are played back through one audio processing unit 120 and a sound output unit (i.e. the calling/receiving unit 125 or the external I/O device 160). Of course, it is possible that, while a plurality of applications are running at the same time, the operation status control unit 210 only allows the sound data processed by an application controlled by the foreground control unit 260 to be outputted by the output unit, or the volume of the sound data processed by an application controlled by the background control unit 270 is made small automatically.

The mode control unit 240 can comprise the foreground control unit 260, controlling the execution of an application that runs in a foreground mode (i.e. an operation mode of an application that shows the operation mode through the display unit 130), and the background control unit 270, controlling the execution of an application that runs in a background mode (i.e. an operation mode of an application that does not show the operation status through the display unit 130 or only show an icon). In case the operation mode of an application is changed by the input of the mode conversion key, the application controlled by the mode control unit 240 can be changed.

Each of the mode control unit 240 (i.e. the foreground control unit 260 and the background control unit 270) receives command data received from the input control unit 220 or the operation status control unit 210 and controls the execution status of an application that is running in the corresponding mode. The application controlled by each of the mode control units 240 can be different from each other or identical to each other.

The operation steps of the mode control unit 240 will be more apparent through the description with reference to relevant drawings.

The screen control unit 250 controls the display unit 130 such that the operation status of an application and the operation status corresponding to the control command can be shown in accordance with the mode control unit 240.

Figure 3:
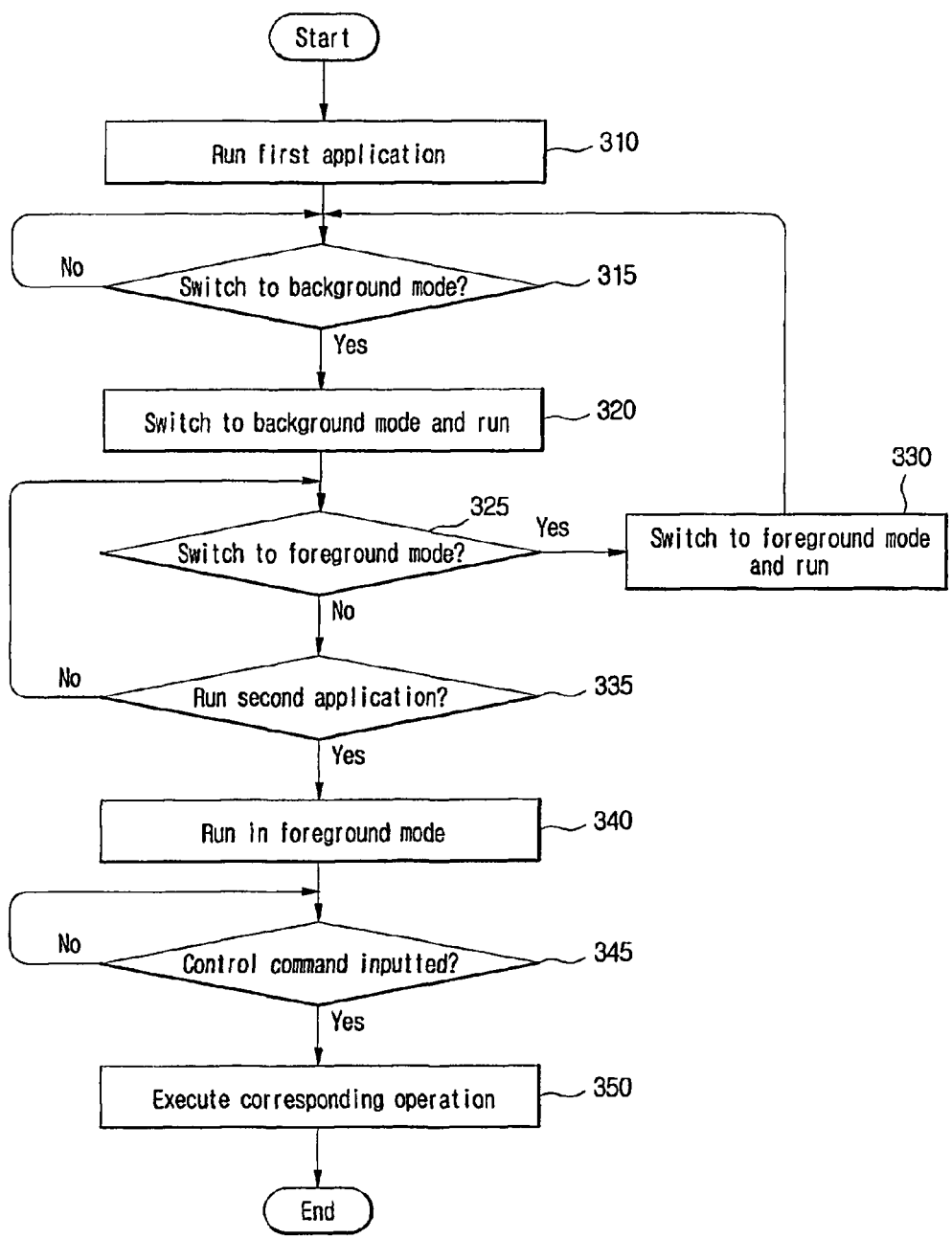
FIG. 3 is a flowchart showing a method for running a plurality of applications in accordance with an embodiment of the present invention.
Figure 4:
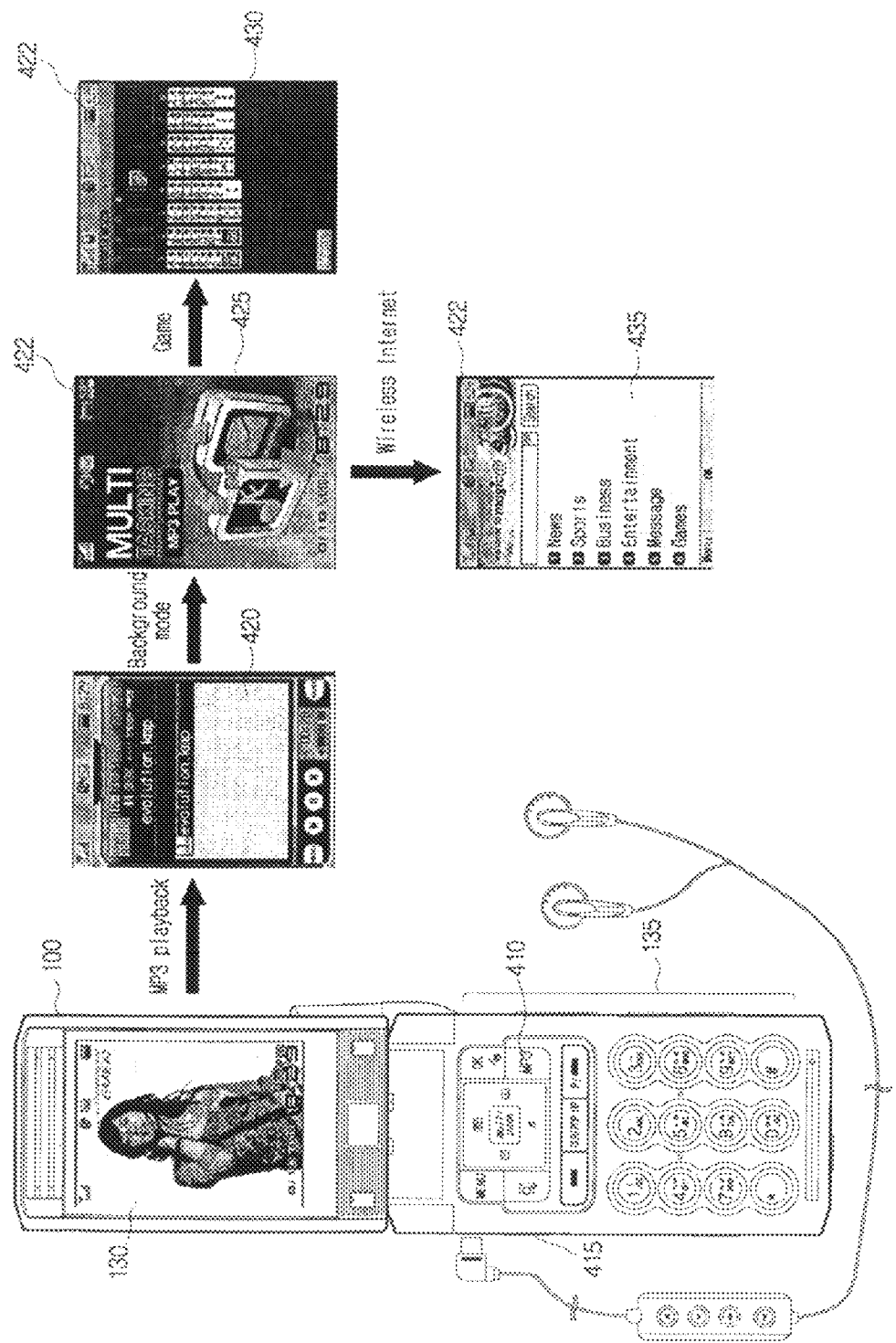
FIG. 4 is a user interface screen illustrating the steps of running a plurality of applications in accordance with an embodiment of the present invention.

FIG. 3 is a flowchart showing a method for running a plurality of applications in accordance with an embodiment of the present invention, and FIG. 4 is a user interface screen illustrating the steps of running a plurality of applications in accordance with an embodiment of the present invention.

Each step shown in FIG. 3 can be performed individually by each element described earlier, but for the sake of convenience of description, the step performed by the mobile communication terminal 100 will be described. Although the steps are assumed to be performed by the mobile communication terminal 100, anyone of ordinary skill in the art shall easily understand the subject of each step.

Referring to FIG. 3, in step 310, the mobile communication terminal 100 runs a first application corresponding to a control command inputted from the input unit 135 or the external I/O device 160. The executed first application will be operated in the foreground mode. The foreground mode of this description refers to an operation mode in which, as in a typical mobile communication terminal, the operation type of an application is shown on the display unit 130 when the application (e.g. playing back an MP3 file, writing a message, playing games and accessing the wireless Internet) is executed. As shown in FIG. 4, when the user selects the MP3 file playback function while the basic screen is displayed, a screen for playing back the MP3 file is displayed on the display unit 130. Since MP3 files can be played back by running an application in the present invention, the present invention does not need to mount a separate processor chip on the mother board.

In step 315, the mobile communication terminal 100 determines whether a mode conversion command for running the application, currently running in the foreground mode, in the background mode is inputted from the input unit 135 or the external I/O device 160. In this description, the background mode refers to an operation mode in which the operation status of the corresponding application is not shown or shown in a minimal format (e.g. an icon) on the display unit 130 but the operation of the application continues. For example, although the MP3 playback function is switched from the foreground mode to the background mode, the song that was selected and being played back in the foreground mode will continue to be played back in the background mode, and the sound will continue to be outputted through the calling/receiving unit 125 or the external I/O device 160.

The user can input a mode conversion command by use of a mode conversion key 415 (refer to FIG. 4). Based on the number of inputs of the mode conversion key, the application can be switched in the order of the background mode, foreground mode, background mode and so on.

If the mode conversion command is not inputted, the mobile communication terminal 100 maintains the application to run in the foreground mode.

If the mode conversion command is inputted, however, in step 320, the mobile communication terminal 100 switches the operation mode to have the application run in the background mode, and runs the application in the background mode. If the operation mode of the application is switched by the mode conversion command of the user, the display unit 130 displays a standby screen 425, indicating that an application is running in the background mode. In addition, the display unit 130 can also show an icon 422 although the standby screen 425 is switched to an operation screen of another application. The icon 422 can be displayed in accordance with the application running in the background mode. It shall be evident that there can be a large number of variations of the standby screen 425 and the icon 422, depending on how the user interface is designed.

In step 335, the mobile communication terminal 100 determines whether a control command for running a second application is inputted from the input unit 135 or the external I/O device 160.

If the control command is not inputted, step 325 is repeated. However, if the control command is inputted, step 340 is performed to run the second application corresponding to the control command in the foreground mode. In other words, it shall be evident that it is not necessary to create a new application to simultaneously run the first application and the second application, each of which is an independent application. The screen 430 of FIG. 4 illustrates the second application running a game while the screen 435 illustrates the second application accessing the wireless Internet.

In step 345, the mobile communication terminal 100 determines whether a control command is inputted from the input unit 135 or the external I/O device 160. Here, the control command can comprise a mode conversion command using the mode conversion key and an execution status control command of an application.

If the control command is not inputted, the process stands by in step 345. If the control command is inputted, however, step 350 is performed to run an operation corresponding to the control command. For example, if the control command is a mode conversion command, the operation mode of each application will be switched. If the control command through the input unit 135 is set to exclude the foreground mode and the control command through the external I/O device 160 is set to exclude the background mode, whether to send the control command to the foreground control unit 260 or to send the control command to the background control unit 270 will be determined, based on where the control command is inputted from, and the operation corresponding to the control command will be run.

In case a plurality of applications are run simultaneously, as described above, and the applications are using the sound output unit together to output sound effects (e.g. a game) or play back audio data (e.g. MP3 file playback), it will be difficult for the user to hear a normal sound. In this case, by setting priorities to use the audio processing unit 120 among the applications, the inconvenience of the user can be minimized. For example, if the audio data playback has a higher priority, the playback sound of the audio data will outputted through the sound output unit only, the sound effects associated with running the game will be suppressed.

Of course, in case a plurality of applications that need to use the audio processing unit 120 simultaneously are selected, it is possible that the application selected later is set to be suppressed or that only the sound data of the application running in the foreground mode is set to be outputted through the sound output unit.

It shall be evident that the above various setting method can be preconfigured by default or selected individually by the user.

Figure 5:
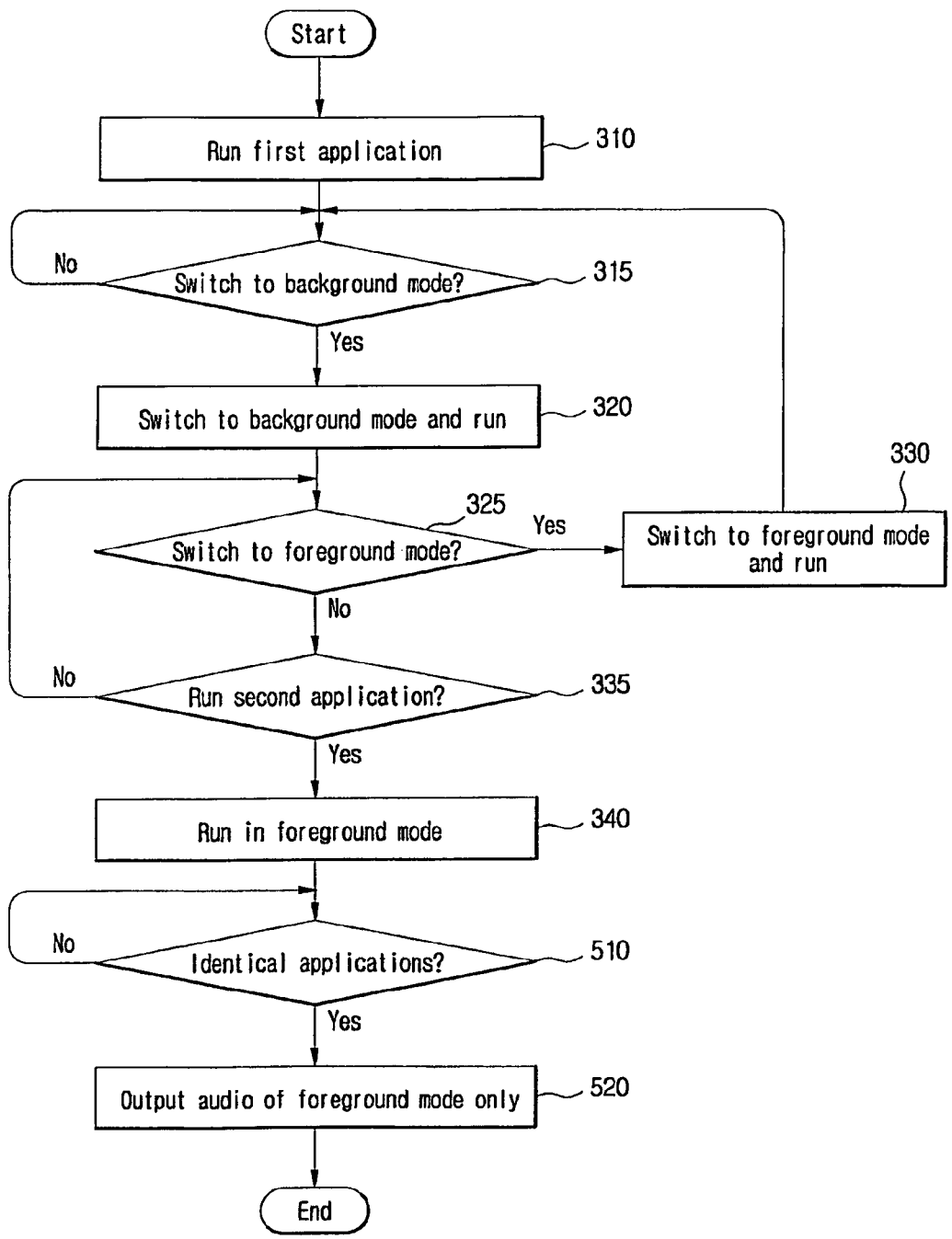
FIG. 5 is a flowchart showing a method for running a plurality of applications in accordance with another embodiment of the present invention.

FIG. 5 is a flowchart showing a method for running a plurality of applications in accordance with another embodiment of the present invention.

In the embodiment described earlier with reference to FIG. 4, the first and second applications were different. In the method for running a plurality of applications in accordance with the present invention, identical applications can be run simultaneously in different operation modes. For example, if both the first application and the second application play back DMB programs, the user can set the first application to show the KBS channel in the foreground mode and the second application to show the MBC channel in the background mode. The user can watch both channels by operating the mode conversion key only.

As shown in FIG. 5, the mobile communication terminal 100 determines in step 510 whether the applications running in a plurality of operation modes are identical and are using the audio processing unit 120.

If the applications are not identical or only one application is set to use the audio processing unit 120 (for example, one application is playing back, and the other application is in a standby mode), the process is treated as in FIG. 4.

If, however, the applications are identical and are using the audio processing unit 120, step 520 is performed to have the sound of the application running in the foreground mode outputted through the sound output unit. Is shall be evident, of course, that there can be a large number of methods to select or control the sound to be outputted.

If both the first and second applications run a SMS application, a received message can be set to be displayed in the foreground mode, and the text can be copied. Then, by use of the mode conversion key, a message writing screen, which was standing by in the background mode, can be made to display in the foreground mode, and the text can be pasted to the displayed message writing screen, making the writing of a message much easier.

Figure 6:
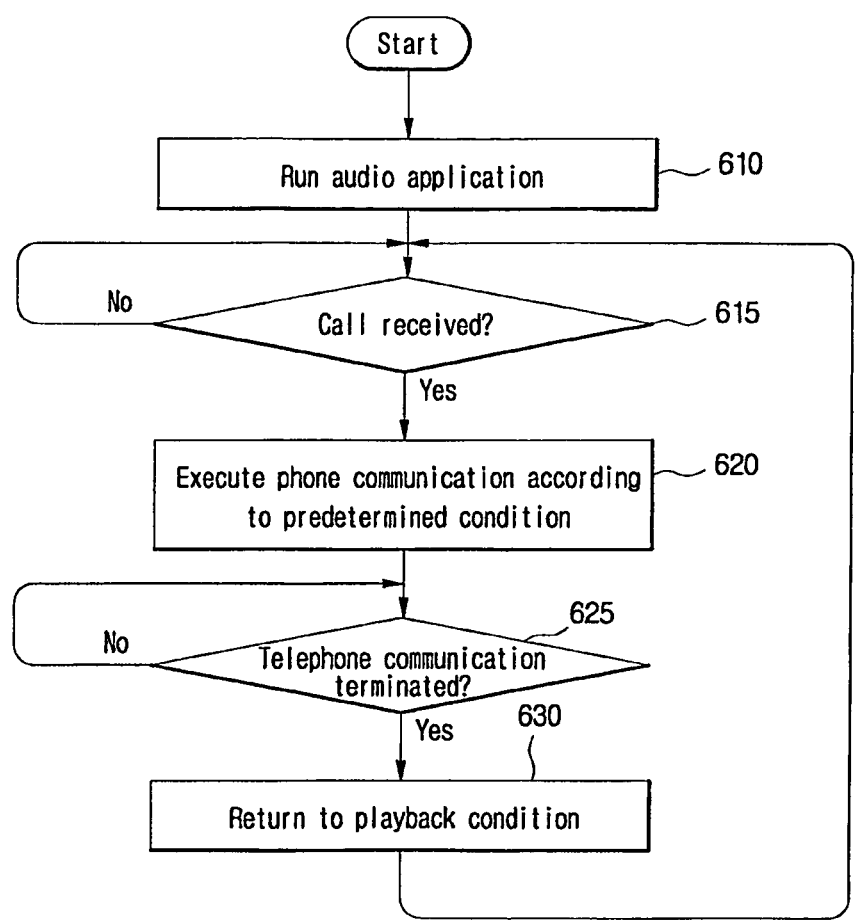
FIG. 6 is a flowchart showing a method of running an audio playback application and a telephone communication function simultaneously in accordance with yet another embodiment of the preferred invention.

FIG. 6 is a flowchart showing a method of running an audio playback application and a telephone communication function simultaneously in accordance with yet another embodiment of the preferred invention.

It is typical that a mobile communication terminal 100 has a variety of applications for additional functions, in addition to its basic function of telephone communication. However, despite the multifunctionality, the most fundamental function of a mobile communication terminal 100 is telephone communication, which must be processed first over other functions.

As long as the currently-running application is not using the audio processing unit 120, it may not be necessary to control the audio processing unit 120 or each mode control unit 240 even if the telephone communication function is executed later. This is because all that needs to be done is controlling the currently-running application to run in the background mode and the telephone communication to be carried out in the foreground mode. After the telephone communication is finished, the user can make a selection with the mode conversion key to have the application run in the foreground mode again.

However, if the currently-running application (e.g. audio file playback) is using the audio processing unit 120, it becomes necessary to control the application in order to allow the telephone communication.

Referring to FIG. 6, the mobile communication terminal 100 executes, in step 610, the application for audio file playback in accordance with the control command from the input unit 135 or the external I/O device 160. The executed application will run in the foreground mode, and will be switched to the background mode in accordance with the user's input of the mode conversion key.

In step 615, the mobile communication terminal 100 determines whether a call for telephone communication is received.

If a call is not received, the application for audio file playback is executed, and the operation corresponding to the control command (e.g. selecting and adding audio data to play back) is carried out.

If a call is received, however, step 620 is performed to carry out the telephone communication function in accordance with a predetermined condition.

That is, if the application for audio file playback is running in the foreground, the mode is switched to have the application run in the background mode in order to, for example, display the caller ID, and the audio file playback is controlled in accordance with a predetermined sound output condition in order to output a bell sound associated with receiving the call. The sound output condition can be any one of a first condition, in which the audio file playback is maintained, a second condition, in which the volume for of audio file playback is brought down below a predetermined level, a third condition, in which the volume of audio file playback is set to 0, and a fourth condition, in which the audio file playback is temporarily stopped until the telephone communication is finished. The sound output condition may be set by default or by the user.

After the bell sound is outputted, the telephone communication will be commenced in accordance with a call start command (e.g. opening the folder) of the user.

The application of the above sound output conditions may be postponed until the call start command is inputted by the user if the notification mode of receiving a call is in a vibration mode, not in the bell sound mode.

In step 625, the mobile communication terminal 100 determines whether the telephone communication, commenced by the call start command, is terminated or is refused by a call refusal command (e.g. opening and immediately closing the folder).

If the telephone communication is in progress, the mobile communication terminal 100 maintains the current condition until the telephone communication is terminated. If the sound output condition is, for example, the first condition or the second condition, the sound outputted through the calling/receiving unit 125 will be able to be mixed with the user's voice and sent to and outputted through the recipient's terminal.

If the telephone communication is terminated or refused, step 630 is performed to have the mobile communication terminal 100 return to the audio file playback condition (e.g. setting the volume) of step 610 and maintain or continue the audio file playback.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

INDUSTRIAL APPLICABILITY

As described above, the present invention can maximize user convenience by enabling a plurality of applications to run simultaneously in a separate operation mode.

The present invention does not cause the user to stop what he or she has been running, by allowing the already-running application to continue to run in a different mode in case a call or a message is received while running the application.

The present invention does not require the modification of existing applications or the generation of a combined application combining applications for simultaneous running, by pluralizing the operation mode of application.

The present invention also can individually control the operation of an application that runs in a plurality of modes.

The present invention also can reduce the manufacturing cost of the terminal by playing back audio data not in an MP3 processor chip but in an application.

The invention claimed is:

1. A method for running a plurality of applications simultaneously in a mobile communication terminal, the method comprising:
   running a first application in a foreground mode in accordance with a first input operation start command;
   running a second application in a background mode in accordance with a second input operation start command;
   determining whether a first key button is input using an input unit located on the mobile communication terminal or whether a second key button is input using an external I/O device coupled through wire or wirelessly to the mobile communication terminal;
   generating a first control command corresponding to the first key button input, if the first key button is input;
   controlling the operation of the second application, using the generated control command;
   generating a second control command corresponding to the second key button input, if the second key button is input;
   controlling the operation of the first application, using the generated second control command,
   switching the first application in the foreground mode and the second application in the background mode with each other, if the input control unit generates and outputs a mode conversion command in accordance with the first set key button input; and determining whether the mode conversion command is input again; and re-setting the operation mode to have the first application run in the foreground mode and the second application run in the background mode if the mode conversion command is input again.

2. The method of claim 1, further comprising:
   determining whether the first application and the second application are audio playback applications;
   outputting a processed sound through a sound output unit if at least one of the applications is the audio playback application; and
   outputting a sound processed by the second application through the sound output unit if both applications are the audio playback application.

3. A mobile communication terminal to run a plurality of applications simultaneously, the mobile communication terminal comprising:
   an input control unit to generate and output command data corresponding to one of an operation start command and a control command in accordance with a set key button input;
   an application management control unit to control at least two applications corresponding to a first and second operation start commands, outputted sequentially by the input control unit, to run sequentially;
   a foreground control unit to control the operation of a first application in accordance with a first control command;
   a background control unit to control the operation of a second application in accordance with a second control command; and
   a screen control unit to control an operation status of the first application to be displayed in a display unit,
   wherein the input control unit recognizes a signal corresponding to a first key button input from an input unit and an external I/O device, so that:
   the input control unit outputs the generated control command to the foreground control unit if the signal is a first control signal from the input unit, the input unit being located on the mobile communication unit and the external I/O device being coupled to the mobile communication terminal through wire or wirelessly, or
   the input control unit outputs the generated control command to the background control unit if the signal is a second control signal from the external I/O unit, the input unit being located on the mobile communication unit and the external I/O device being coupled to the mobile communication terminal through wire or wirelessly,
   wherein the application management control unit controls the application controlled by the foreground control unit and the application controlled by the background control unit to switch with each other, if the input control unit generates and outputs a mode conversion command in accordance with the set key button input; and determining whether the mode conversion command is input again; and re-setting the operation mode to have the first application run in the foreground mode and the second application run in the background mode if the mode conversion command is input again.

* * * * *